United States Patent
Wikström et al.

(10) Patent No.: US 10,462,799 B2
(45) Date of Patent: Oct. 29, 2019

(54) FIRST NODE AND A METHOD THEREIN

(71) Applicant: Telefonaktiebolaget LM Ericsson (publ), Stockholm (SE)

(72) Inventors: Gustav Wikström, Täby (SE); Johan Söder, Stockholm (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 15/541,029

(22) PCT Filed: Jan. 30, 2015

(86) PCT No.: PCT/SE2015/050106
§ 371 (c)(1),
(2) Date: Jun. 30, 2017

(87) PCT Pub. No.: WO2016/122363
PCT Pub. Date: Aug. 4, 2016

(65) Prior Publication Data
US 2018/0220430 A1   Aug. 2, 2018

(51) Int. Cl.
*H04W 4/00* (2018.01)
*H04W 72/08* (2009.01)
(Continued)

(52) U.S. Cl.
CPC ........ *H04W 72/085* (2013.01); *H04B 17/318* (2015.01); *H04L 43/16* (2013.01); *H04W 84/12* (2013.01)

(58) Field of Classification Search
None
See application file for complete search history.

(56) References Cited

U.S. PATENT DOCUMENTS

| 7,623,494 B2 | 11/2009 | Zhu et al. |
| 7,830,848 B2 | 11/2010 | Mhatre et al. |

(Continued)

FOREIGN PATENT DOCUMENTS

| CN | 104202755 A | 12/2014 |
| EP | 3116255 A1 | 1/2017 |

(Continued)

OTHER PUBLICATIONS

International Search Report and Written Opinion of the International Searching Authority for International Application No. PCT/SE2015/050106 (dated Nov. 19, 2015) 12 pages.

(Continued)

*Primary Examiner* — Phuongchau Ba Nguyen
(74) *Attorney, Agent, or Firm* — Sage Patent Group

(57) ABSTRACT

A first node and a method therein for controlling transmission of a first signal. The first node is operating in a Basic Service Set (BSS) comprised in a Wireless Local Area Network (WLAN). The first node detects a second signal transmitted from a second node operating in the WLAN. Further, the first node compares a signal strength of the second signal with a threshold value for the second node, which threshold value is determined based on the node type of the second node. Furthermore the first node transmits the first signal when the signal strength of the second signal is below the threshold value, and defers from transmitting the first signal when the signal strength of the second signal is above the threshold value. Thereby the transmission of the first signal is controlled.

27 Claims, 5 Drawing Sheets

Method in a first node 402,406

(51) Int. Cl.
  *H04B 17/318* (2015.01)
  *H04L 12/26* (2006.01)
  *H04W 84/12* (2009.01)

(56) References Cited

U.S. PATENT DOCUMENTS

| | | | |
|---|---|---|---|
| 8,666,319 | B2 | 3/2014 | Kloper et al. |
| 9,282,539 | B2 | 3/2016 | Tian et al. |
| 9,319,191 | B2 | 4/2016 | Barriac et al. |
| 9,379,837 | B2 | 6/2016 | Jindal et al. |
| 2006/0046739 | A1 | 3/2006 | Blosco et al. |
| 2006/0268924 | A1* | 11/2006 | Marinier ............ H04W 52/241 370/445 |
| 2007/0264950 | A1 | 11/2007 | Husted, Jr. et al. |
| 2012/0044978 | A1* | 2/2012 | Wang .................... H04B 7/024 375/219 |
| 2013/0017794 | A1 | 1/2013 | Kloper et al. |
| 2014/0254510 | A1 | 9/2014 | Porat |
| 2014/0328191 | A1 | 11/2014 | Barriac et al. |
| 2016/0174200 | A1* | 6/2016 | Seok .................... H04W 72/04 370/329 |
| 2016/0360489 | A1* | 12/2016 | Boodannavar ....... H04B 7/0413 |

FOREIGN PATENT DOCUMENTS

| | | |
|---|---|---|
| JP | 4406650 | 11/2009 |
| WO | 04/77847 | 9/2004 |

OTHER PUBLICATIONS

Son, J., "Further Considerations on Enhanced CCA for 11ax," IEEE Draft, 802.11-14/0847r0, WILUS Institute, Jul. 15, 2014, 12 pages.
Choudhury, S., "Impact of CCA Adaptation on Spatial Reuse in Dense Residential Scenario," IEEE Draft, 802.11-14/0861r0, Nokia, Jul. 14, 2014, 11 pages.
Yano, K., et al., "Area Throughput Enhancement of OFDM-based Wireless LAN in OBSS Environment by Physical Header Modification and Adaptive Array Antenna," IEEE 20th International Symposium on Personal Indoor and Mobile Radio Communications (PIMRC 2009), XP031659611, Sep. 13, 2009, 5 pages.
Zeng, Li, et al., "Overlapping Impacts and Resource Coordination for High-Density Wireless Communication," IEEE RIVF '09 International Conference on Computing and Communication Technologies, Jul. 13, 2009, 7 pages.
Supplementary European Search Report, EP 15880331, dated Jan. 2, 2018, 4 pages.
Hedayat, R., "Considerations for Adaptive CCA," IEEE Draft (IEEE 803.11-14/1448r2) Nov. 3, 2014, XP068117962, retrieved from the internet (retrieved on Nov. 7, 2014): <httts://mentor.ieee.org/802.11/dcn/14/11-14-1448-02-00ax-considerations-for-adaptive-cca.pptx> 13 pages.
Porat, R., et al., "Improved Spatial Reuse Feasibility—Part 1," IEEE Draft (IEEE 802.11-14/0082r0) Jan. 20, 2014, 19 pages.
Hedayat, R., "Adaptive CCA for 11ax," IEEE Draft (IEEE 802.11-14/1233r2) Sep. 14, 2014, XP68071076, retrieved from the internet (retrieved on Sep. 16, 2014) <http://11-14-1233-02-00ax-adaptive-cca-for-11ax> 14 pages.

* cited by examiner

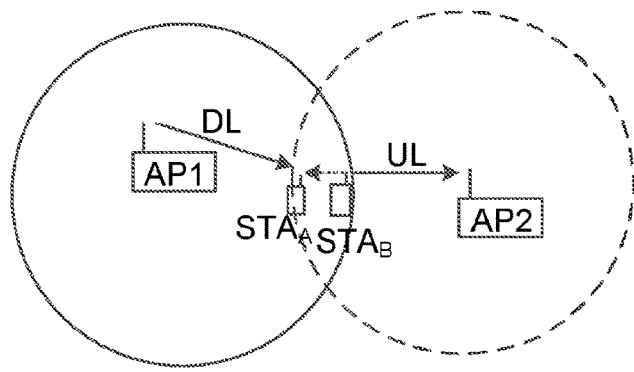
Fig. 3a Strong interference
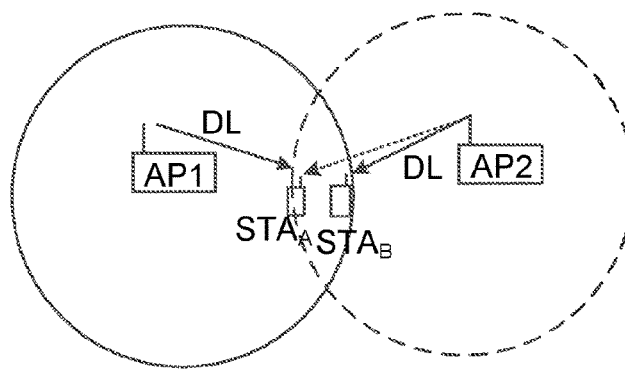
Fig. 3b Weak interference
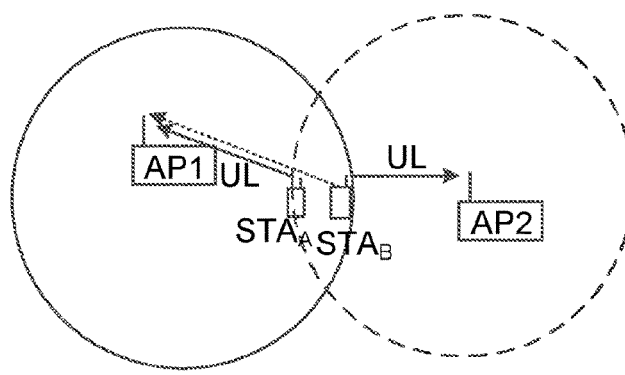
Fig. 3c Weak interference

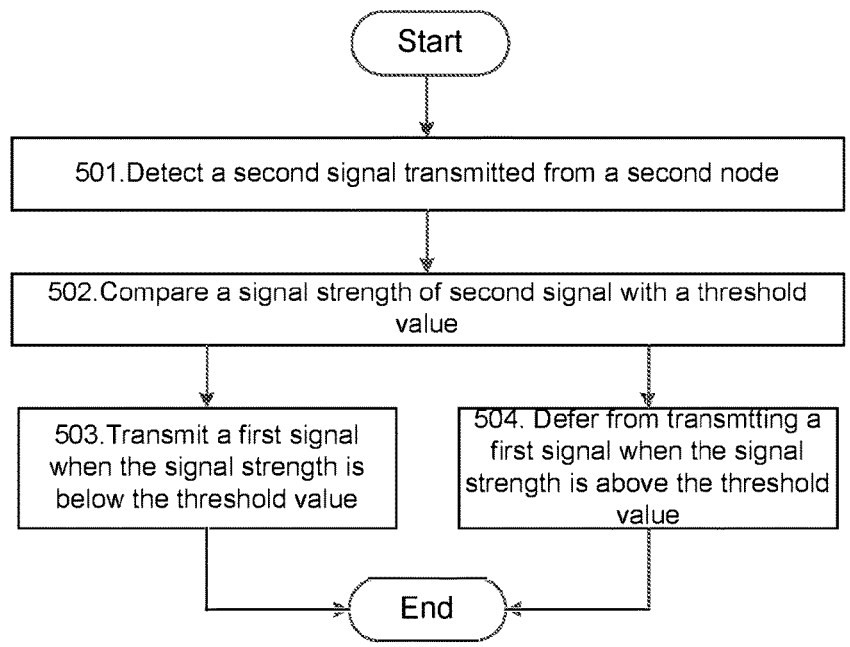
Fig. 5 Method in a first node 402,406
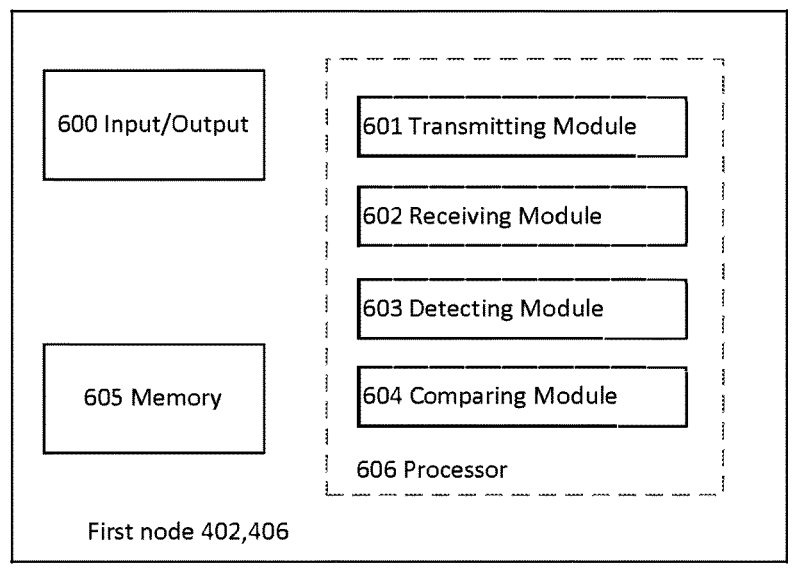
Fig. 6

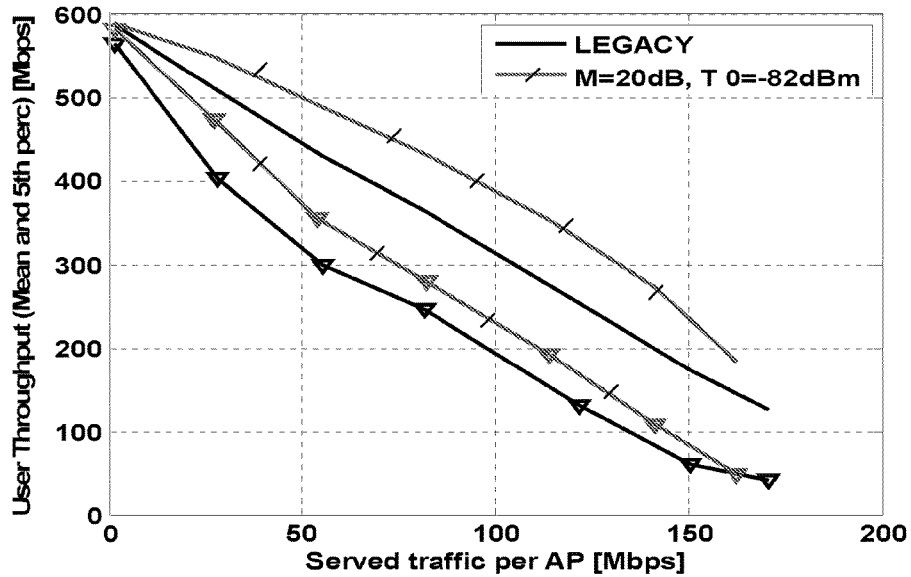
Fig. 7a DL user throughput, mean value and 5th percentile (Δ)
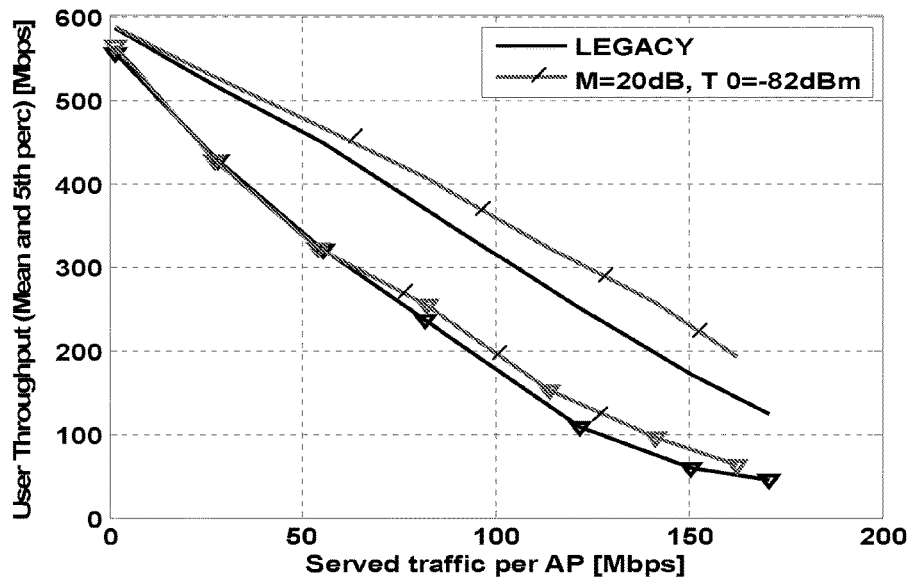
Fig. 7b UL user throughput, mean value and 5th percentile (Δ)

FIRST NODE AND A METHOD THEREIN

CROSS REFERENCE TO RELATED APPLICATIONS

This application is a 35 U.S.C. § 371 national stage application of PCT International Application No. PCT/SE2015/050106, filed on Jan. 30, 2015, the disclosure and content of which is incorporated by reference herein in its entirety.

TECHNICAL FIELD

Embodiments herein relate generally to a method performed by a first node operating in a Basic Service Set (BSS) comprised in a Wireless Local Area Network (WLAN). In particular, they relate to controlling transmission of a first signal.

BACKGROUND

The Institute of Electrical and Electronics Engineers (IEEE) 802.11 standard specification defines the physical (PHY) layer and Media Access Control (MAC) layer for Wireless Local Area Networks (WLANs), cf. IEEE Standard for Information technology—Tele-communications and information exchange between systems. Local and metropolitan area networks—Specific requirements. Part 11: Wireless LAN Medium Access Control (MAC) and Physical Layer (PHY) Specifications. According to the Wi-Fi Alliance, a Wi-Fi may be defined as any WLAN products that are based on the Institute of Electrical and Electronics Engineers' (IEEE) 802.11 standards. Thus, in this document the terms Wi-Fi and WLAN will be used interchangeably.

WLAN is based on a technology that currently mainly operates on the 2.4 GHz or the 5 GHz band. The IEEE 802.11 specifications regulate the physical layer, MAC layer and other aspects of one or more access points and mobile terminals comprised in the WLAN in order to secure compatibility and inter-operability between access points and mobile terminals. The mobile terminal is herein sometimes also referred to as a User Equipment (UE). The WLAN is generally operated in unlicensed bands, and as such, communication in the WLAN may be subject to interference sources from any number of both known and unknown devices. The WLAN may be used as a wireless extension to fixed broadband access. For example, this may be the case in domestic environments and hotspots, like airports, train stations and restaurants.

The WLAN technology relies on Carrier Sensing Multiple Access with Collision Avoidance (CSMA/CA) in order to effectively and fairly share the wireless medium among different WLAN entities and even among different Radio Access Technologies (RATs). CSMA/CA applied by the WLAN system demands that a node, e.g. an access point or a station, that wishes to send data senses the common communication channel before carrying out a transmission in order to avoid duplicate transmissions on the common communication channel. The reason or this is that duplicate transmission on the common communication channel usually results in loss of data and the need of retransmissions. In order for a node to deem the channel busy, it has to detect a transmission, the received signal strength level of which surpasses a pre-determined threshold, referred to as the Clear Channel Assessment (CCA) Threshold (CCAT). An exemplary relation between the coverage area of a Basic Service Set (BSS) and the CCAT is schematically depicted in FIG. 1.

In current systems, one common CCAT is defined for all nodes operating in the WLAN and this common CCAT is to be used by all nodes when they perform channel sensing for transmission to and from any other node in the WLAN.

FIG. 2 schematically illustrates a WLAN protocol stack. As illustrated, the IEEE layer specification comprises a Data Link Layer comprising a Medium Access Control (MAC) sublayer, and a Physical Layer comprising a Physical Layer Convergence Procedure (PLCP) sublayer and a Physical Medium Dependent (PMD) sublayer. The PLCP sublayer performs the CCA and reports the results to the MAC layer, therefore the CCA threshold is set in the PLCP sublayer.

US 2014/0286203 A1 discloses a wireless communication device that includes communication interface configured to receive and transmit signals and a processor configured to generate and process such signals. The communication interface of the wireless communication device is configured to receive a first signal from a first other wireless communication device, and the processor of the wireless communication device is configured to process the first signal to determine one or more concurrent transmission parameters. The processor of the wireless communication device is configured to generate the second signal based on the one or more concurrent transmission parameters and direct the communication interface to transmit the second signal to a second other wireless communication device during receipt of the first signal from the first other wireless communication device. The wireless communication device may be configured to make such concurrent transmissions based on one or more considerations such as the power level of the first signal.

The state of the art WLANs are associated with some drawbacks such as the suboptimal usage of the transmission medium.

SUMMARY

Therefore, an object of embodiments herein is to provide a way of improving the performance in a wireless communications network.

According to a first aspect of embodiments herein, the object is achieved by a method performed by a first node for controlling transmission of a first signal. The first node is operating in a Basic Service Set (BSS) comprised in a Wireless Local Area Network (WLAN).

The first node detects a second signal transmitted from a second node operating in the WLAN.

Further the first node compares a signal strength of the second signal with a threshold value for the second node, which threshold value is determined based on the node type of the second node.

Furthermore, the first node transmits the first signal when the signal strength of the second signal is below the threshold value, and defers from transmitting the first signal when the signal strength of the second signal is above the threshold value, whereby the transmission of the first signal is controlled.

According to a second aspect of embodiments herein, the object is achieved by a first node for controlling transmission of a first signal. The first node is operating in a Basic Service Set (BSS) comprised in a Wireless Local Area Network (WLAN).

The first node is configured to detect a second signal transmitted from a second node operating in the WLAN.

Further, the first node is configured to compare a signal strength of the second signal with a threshold value for the second node, which threshold value is determined based on the node type of the second node.

Furthermore, the first node is configured to transmit the first signal when the signal strength of the second signal is below the threshold value, and to defer from transmitting the first signal when the signal strength of the second signal is above the threshold value, whereby the transmission of the first signal is controlled.

According to a third aspect of embodiments herein, the object is achieved by a computer program, comprising instructions which, when executed on at least one processor, causes the at least one processor to carry out the method in the first node.

According to a fourth aspect of embodiments herein, the object is achieved by a carrier comprising the computer program, wherein the carrier is one of an electronic signal, an optical signal, a radio signal or a computer readable storage medium.

Since the first node detects a second signal transmitted from a second node operating in the WLAN, since the first node compares a signal strength of the second signal with a threshold value for the second node, which threshold value is determined based on the node type of the second node, and since the first node transmits the first signal when the signal strength of the second signal is below the threshold value, and defers from transmitting the first signal when the signal strength of the second signal is above the threshold value, the transmission of the first signal is controlled. Thereby the utilization of the transmission medium is improved. This results in an improved performance in the wireless communications network.

An advantage by embodiments herein is that by using different threshold values depending on for example the type of the interfering node unnecessary back-offs, e.g. unnecessary deferrals of transmission, may be avoided. Thereby, the transmission medium may be better utilized.

Another advantage by embodiments herein is that the impact of interference in a WLAN is reduced. Especially, by embodiments herein the impact of interference in a WLAN MAC is reduced.

Yet another advantage by embodiments herein is that the air efficiency and user experience in a WLAN system is improved by means of deferring to a lesser extent for OBSS transmission links of the same type as the intended link, which improves spatial reuse and limits the interference experienced by the receivers.

Further, by avoiding collisions with transmissions from the same BSS, the fraction of successfully received transmissions is increased, which improves the system throughput.

Furthermore, by letting DL transmissions defer strongly from UL transmissions and vice versa, the WLAN system will approach a synchronized Time Division Duplex (TDD) system, where the DL and UL transmissions are performed in predefined time slots. By the expression "letting DL transmissions defer strongly from UL transmissions and vice versa" is meant that the threshold values for DL and UL transmissions and the threshold values for UL and DL transmission are set lower than the threshold values for DL and DL transmissions and the threshold values for UL and UL transmission which means that the DL transmissions defer easier e.g. at a lower power, from UL transmission than from DL transmissions, and that the UL transmissions defer easier, e.g. at a lower power, from DL transmission that from UL transmissions. In other words, by the expression "letting DL transmissions defer strongly from UL transmissions and vice versa" is meant that the threshold value for initiating a DL transmission from the first node when a second signal is detected as being an UL transmission and the threshold value for initiating an UL transmission when a second signal is detected as being a DL transmission are set lower than the threshold values used when the transmission to be initiated is of the same type as a second detected signal. This reduces harmful interference. Also, by being less sensitive when listening to OBSS transmissions of the same type (DL or UL), i.e. of the same type as the first signal to be transmitted, the system approaches a full reuse 1 system, meaning that the spectrum is reused completely in every BSS.

Taken together, these changes should bring the performance of the system closer to an optimum.

BRIEF DESCRIPTION OF DRAWINGS

Examples of embodiments herein are described in more detail with reference to attached drawings in which:

FIGS. 3a-3c schematically illustrates examples of different interference situations;

FIG. 5 is a flowchart depicting embodiments of a method in a first node;

FIG. 6 is a schematic block diagram illustrating embodiments of a first node; and FIGS. 7a and 7b schematically illustrate the downlink user throughputs and uplink user throughputs, respectively, for a legacy system and for embodiments herein.

DETAILED DESCRIPTION

Figure 1:
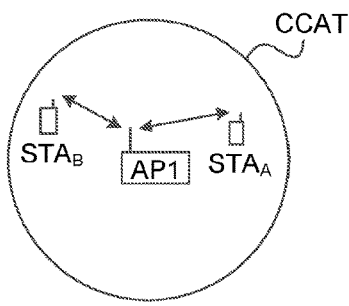
FIG. 1 schematically illustrates an exemplary relation between the coverage area of a BSS and the CCAT according to prior art.
Figure 2:
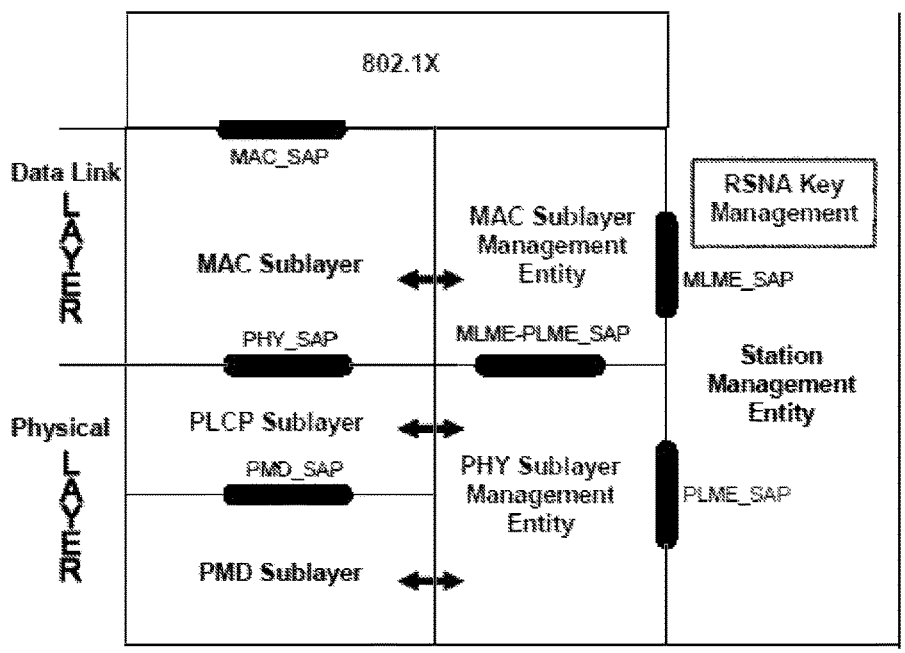
FIG. 2 schematically illustrates an embodiment of a WLAN protocol stack.

As part of developing embodiments herein, some problems will first be identified and discussed.

As previously mentioned, in WLANs, a Clear Channel Assessment (CCA) threshold is specified to define a range within which a WLAN node, e.g. an Access Point (AP) or a station (STA), will sense the transmission of other WLAN devices in order to avoid transmission collision, e.g. in order to avoid interference.

Three tasks should be fulfilled by the CCA. The first is to avoid collision, e.g. avoid transmitting to a node that is transmitting or receiving data already. The second is to make sure that the intended transmission is received with acceptable Signal to Interference plus Noise Ratio (SINR). The third is that ongoing transmissions should be protected.

Using one threshold, e.g. one CCA threshold, based on for example received power is not optimal from a performance perspective, since nodes in the WLAN may be prevented from transmitting even though the transmission is likely to be successful and not likely to disturb other ongoing transmissions. In other words, by using one CCA threshold, a WLAN node may be prevented from transmitting even though the transmission is not likely to cause interference. This is therefore not an efficient use of the available spectrum, i.e. the available transmission medium.

Thus, the state of the art WLANs are associated with some drawbacks such as a non-optimized usage or a non-efficient usage of the transmission medium since the threshold used by all nodes is set by a worst case interference situation. In order to further explain some different interference situations reference is made to FIGS. 3a-3c. FIGS. 3a-3c schematically illustrates a first Basic Service Set (BSS) comprising an access point AP1 and a station $STA_A$, and a second, neighbouring, BSS comprising an access point AP1 and a station $STA_B$.

FIG. 3a schematically illustrates a strong interference situation, wherein a transmission from the access point AP1 to the station $STA_A$, herein also referred to as downlink (DL), is vulnerable for interference from another close-by station $STA_B$ transmitting to the access point AP2, herein also referred to as uplink (UL).

FIG. 3b schematically illustrates a weak interference situation, wherein a DL transmission from the access point AP2 to the station $STA_B$ is less likely to cause severe interference to the DL transmission from the access point AP1 to the station $STA_A$, since the interfering access point AP2 is unlikely to be very close to the station $STA_A$.

FIG. 3c schematically illustrates another weak interference situation, wherein an UL transmission from the station $STA_A$ to the access point AP1 is interfered by an UL transmission from the station $STA_B$ to the access point AP2. However, also in this case, the interference is weak since the interfering station $STA_B$ is unlikely to be very close to the access point AP2.

In summary, an UL transmission is more likely to cause severe interference in an ongoing DL transmission, than in an ongoing UL transmission.

Further, when a station, e.g. $STA_A$, is about to transmit an access point, e.g. AP1, it should make sure no other STA in the same BSS is already transmitting to the access point, otherwise the access point may not be available to receive the transmission, since it is busy receiving another transmission. Also, the access point should not transmit when the station is trying to transmit to it.

As schematically illustrated in FIGS. 3a-3c above, if one threshold value should be used by all nodes in all situations, the worst case needs to dictate this threshold, leading to suboptimal performance in other cases. With reference to FIGS. 3a-3c, the prior art threshold value will be set based on the worst case situation, i.e. the situation illustrated in FIG. 3a, which will cause a suboptimal performance in the weak interference cases illustrated in FIGS. 3b and 3c, wherein the AP1 and the $STA_A$, respectively, should be allowed to transmit, since the interfering transmission from the AP2 and $STA_B$, respectively, are weak.

These and other shortcomings are addressed by embodiments herein.

In order to overcome the shortcomings mentioned above, different threshold values are used.

Further, by using different threshold values depending on for example the type of the interfering node unnecessary back-offs, e.g. deferrals of transmission, may be avoided. Thereby, the transmission medium may be better utilized.

Therefore, according to embodiments herein, a way of improving the performance in a wireless communications network is provided by controlling transmission of a first signal from a first node such that the first signal is transmitted when a signal strength of a second signal transmitted from a second node is below a threshold value, which threshold value is determined based on the node type of the second node.

According to some embodiments, the threshold value may not only be dependent on the node type of the second node but may also be dependent on the node type of the first node and/or on whether or not the second signal is transmitted from within the BSS or not.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 4A:
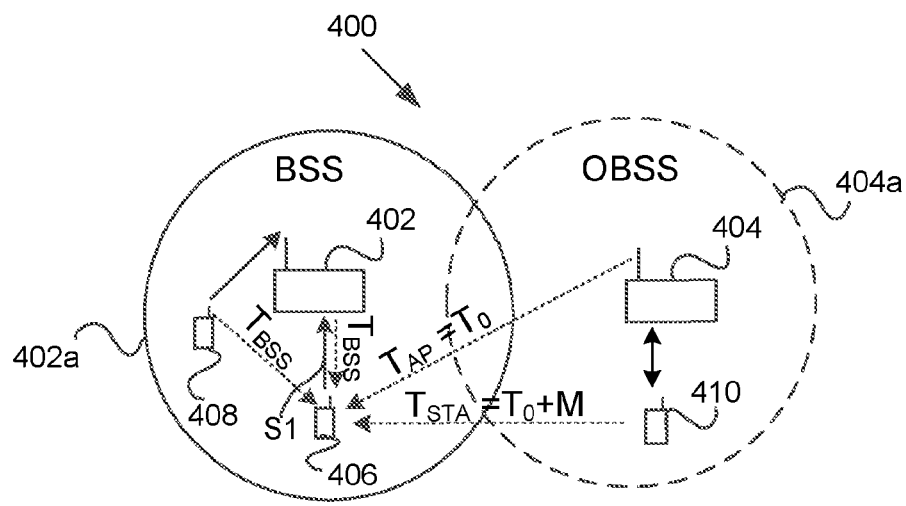
FIGS. 4a and 4b schematically illustrate embodiments of a WLAN.
Figure 4B:
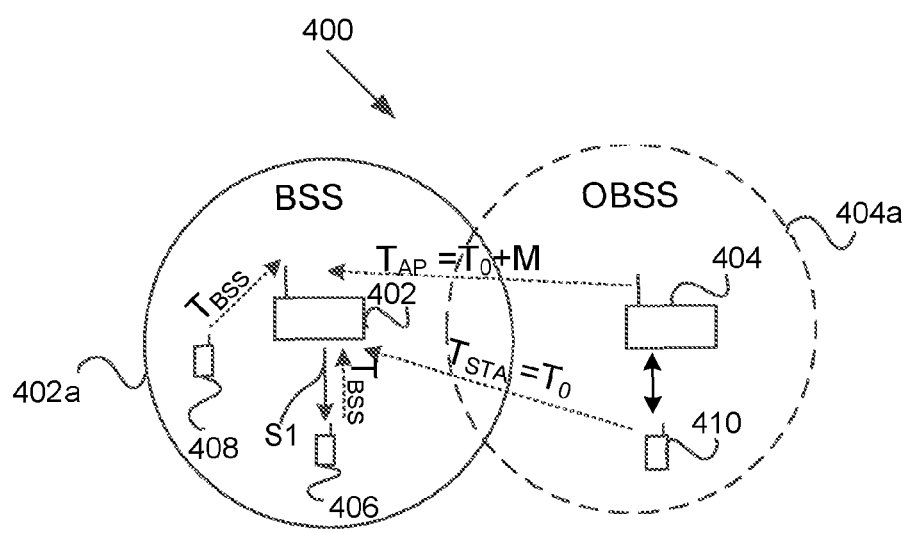

FIGS. 4a and 4b illustrate a wireless communications network 400 in which embodiments herein may be implemented. The wireless communications network 400 may comprise a Wireless Local Area Network (WLAN). Sometimes, the wireless communications network 100 is referred to as comprising two or more wireless communications sub-networks, which sub-networks may be different types of wireless communications networks or may be the same type of wireless communications network but belonging to different operators.

The WLAN may be any wireless computer network that by means of a wireless distribution method links two or more devices within a limited area such as a home, a school, a shopping mall, a coffee shop, a computer laboratory, or an office building. The wireless distribution method may be a spread-spectrum method or an Orthogonal Frequency-Division Multiplexing (OFDM) radio method. For example, the WLAN may be implemented according to the IEEE 802.11 standard. The IEEE 802.11 standard comprises a set of Media Access Control (MAC) and Physical layer (PHY) specifications for implementing WLAN computer communication in the 2.4, 3.6, 5 and 60 GHz frequency bands.

The WLAN 400 comprises a first node 402,406. The first node 402,406 may be a first wireless Access Point (AP) node 402 operating in a Basic Service Set (BSS) and having a first radio frequency (RF) coverage area 402a. Alternatively, the first node 402,406 may be a first wireless device 406 operating in the BSS. A second wireless device 408 may further be operating in the BSS. The first AP node 402 is configured to communicate with one or more wireless devices, e.g. the first wireless device 406 and the second wireless device 408, comprised in the BSS.

Further, the WLAN 400 comprises a second node 402, 404,406,408,410.

In some embodiments, the WLAN 400 comprises a second wireless Access Point (AP) node 404 operating in an Overlapping BSS (OBSS) and having a second radio frequency (RF) coverage area 404a. The OBSS is overlapping the BSS and thus the first coverage area 404a is overlapping the second coverage area 402a, as is illustrated in FIGS. 4a and 4b. A third wireless device 410 may further be operating in the OBSS. The second AP node 404 is configured to communicate with one or more wireless devices, e.g. the third wireless device 410, comprised in the BSS.

In this description, the first and second coverage areas 402a and 404a are sometimes also referred to as the BSS 402a and the OBSS 404a, respectively.

In some embodiments, the first node 402,406 may be the wireless AP node 402 and the second node 402,404,406, 408,410 may be at least one of the second AP node 404, the first wireless device 406, the second wireless device 408 and the third wireless device 410.

In some alternative embodiments, the first node 402,406 may be the first wireless device 406 and the second node 402,404,406,408,410 may be at least one of the first AP node 402, the second AP node 404, the second wireless device 408 and the third wireless device 410.

Thus, in embodiments described herein, the first node 402,406 is a node comprised in the BSS. The node could either be an AP node, e.g. the first AP node 402, or a wireless device, e.g. the first wireless device 406, comprised in the BSS. The second node 402,404,406,408,410 is either a node in the BSS or an node in the OBSS.

The wireless AP node 402,404 may be a WLAN AP. Sometimes herein, the terms "WLAN node", "AP node" and "AP" are used interchangeably. In some embodiments, the first and second wireless AP nodes 402,404 are different types of wireless AP nodes.

Further, the wireless AP node 402,404 is a device that allows one or more wireless devices to connect to a wired network using Wi-Fi, or related standards. The wireless AP node 402,404 may connect to a router (not shown) via a wired network but it may also be an integral component of the router itself.

The wireless device 406,408,410 herein also referred to as a station (STA), user equipment or UE, operate in the wireless communications network 400. The wireless device 406,408,410 may e.g. be a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in the wireless communications network 400. Please note that the term user equipment used in this document also covers other wireless devices such as Machine to Machine (M2M) devices, even though they do not have any user.

Further, in FIGS. 4a and 4b, the dotted lines schematically illustrate interfering signals or interfering transmissions transmitted from one or more interfering nodes. The threshold values for the respective interfering signal is indicated by $T_{BSS}$, $T_{AP}$, $T_{STA}$, wherein the subscript BSS indicates that the interfering node (either an access point node or a station) is operating in the BSS, the subscript AP indicates that the interfering node is an access point node operating in the OBSS, and the subscript STA indicates that the interfering node is a station operating in the OBSS. The details of the interfering signals and the threshold values will be described below. However, it should be understood that the interfering signal is herein sometimes referred to as a second signal, and that the interfering node is herein sometimes referred to as a second node.

A method performed by a first node 402,406 for controlling transmission of a first signal will now be described with reference to a schematic flowchart of FIG. 5. As mentioned above, the first node 402,406 is operating in the Basic Service Set (BSS) 402a comprised in the WLAN 400.

In FIGS. 4a and 4b, the first signal is indicated by S1. As schematically illustrated in FIG. 4a, the first node is the station 406 and the first signal S1 is to be transmitted from the station 406 to e.g. the AP node 402. In FIG. 4b, the first node is the AP node 402 and the first signal S1 is to be transmitted from the AP node 402 to e.g. the station 406.

The method comprises one or more of the following actions. It should be understood that actions may be taken in another suitable order and that actions may be combined.

Action 501

The first node 402,406 detects a second signal transmitted from a second node 402,404,406,408,410 operating in the WLAN 400. By detecting a second signal before transmitting the first signal, the first node 402,406 may detect that the second signal may cause harmful interference to the first signal if the first signal is transmitted. In such case, the first node 402,406 may defer with the transmission in order to avoid loss of data and the possible need of retransmissions.

In FIGS. 4a and 4b, examples of one or more possible second signals are given by the dotted arrows.

In this description, the terms "detect" and "sense" may be used interchangeably.

Further, the first node 402,406 may sometimes be referred to as a sensing node or a detecting node since it senses and/or detects a possible ongoing transmission before possibly transmitting a signal, i.e. before possibly transmitting the first signal.

The second node 402,404,406,408,410 may sometimes be referred to as an interfering node since it may transmit an interfering signal, i.e. since it may transmit the possible ongoing transmission which the sensing node detects.

In some embodiments, the first node 402,406 further detects the node type of the second node 402,404,406,408,410 by determining a node type identity based on the detected signal. The node type identity may be determined based on a Partial Identity (PAID) or a Group Identity (GROUP ID) stated in a SIG A1 field of a Very High Throughput (VHT) preamble comprised in the detected signal.

Further, the first node 402,406 may detect whether the second node 402,404,406,408,410 is operating in the BSS 402a or in an Overlapping BSS (OBSS) 404a overlapping the BSS 402a and comprised in the WLAN 400 by reading an BSS identity comprised in the detected signal. The BSS identity may be given by reading the Partial Identity (PAID) or the Group Identity (GROUP ID) stated in the SIG A1 field of the Very High Throughput (VHT) preamble comprised in the detected signal.

For example, when an STA transmits to an AP the SIG A1 field comprises a bitwise part of the BSSID of the receiving AP, and when an AP transmits to a STA the PAID is a combination of the Association ID (AID) of the STA and the BSSID of the AP. Thus, by listening to periodic beacons from the APs, a node may create a list of the BSSIDs present. When it reads a PAID it may then do the identification of node type:

$PAID_k \in L_{BSSID} \rightarrow k \in AP$,
otherwise $\rightarrow k \in STA$.

Here, $L_{BSSID}$ is a list of the bitwise parts of the occurring BSSIDs.

As mentioned above, another option to detect the source node type is by reading the GROUP ID in available in the VHT SIG A1 field. The GROUP ID is set to 0 for STA to AP transmissions and 63 for AP to STA transmissions.

It should be understood that in some embodiments it is sufficient to know whether the second node 402,404,406, 408,410 belongs to the BSS or not. Thus, knowledge of the identity of the specific OBSS is not required.

In some embodiments, the first node 402,406 detects whether or not the second signal is from the BSS or not by reading a color field in a PHY header comprised in the second signal. The color field was first introduced in IEEE 802.11ah, and by reading the color field the first node 402,406 may determine if the second signal originates from within the BSS or not by comparing to its own color:

$Color_{second\ node} = Color_{first\ node} \rightarrow$ second node$\in$BSS,
$Color_{second\ node} \neq Color_{first\ node} \rightarrow$ second node$\in$OBSS.

Action 502

The first node 402,406 compares a signal strength of the second signal with a threshold value for the second node 402,404,406,408,410, which threshold value is determined based on the node type of the second node 402,404,406, 408,410. Thus, the threshold value may be specific for the node type of the second node.

In some embodiments, the threshold value for the second node 402,404,406,408,410 is based on whether the second node 402,404,406,408,410 is operating in the BSS 402a or in the OBSS 404*a* overlapping the BSS 402*a* and comprised in the WLAN 400. Thus, in such embodiments, the threshold value may be determined based on the node type of the second node and based on whether the second node is in the BSS or in an OBSS.

Further, in some embodiments, the threshold value for the second node 402,404,406,408,410 is determined based on the node type of the first node 402,406. Thus, in such embodiments, the threshold value is determined based on the node type of both the first and second nodes. Alternatively, the threshold value may be determined based on the node type of both the first and second nodes and based on whether the second node is in the BSS or in an OBSS.

Some exemplary threshold values will be given below with reference to FIGS. 4*a* and 4*b*.

When the node type of the second node 406,408 is a station (STA) operating in the BSS 402*a*, the threshold value is given by $T_{BSS}=T_{default}$ dBm, wherein the $T_{default}$ is a default Clear Channel Assessment, CCA, threshold value. Thus, when the second signal is transmitted from the station 406,408 it has a threshold value $T_{BSS}$, and in FIGS. 4*a* and 4*b* this is schematically illustrated by the dotted arrows with label $T_{BSS}$ going from the stations 406,408. Further, in some embodiments, $T_{default}$ is set to −82 dBm.

When the node type of the second node 402 is a WLAN Access Point, AP, operating in the BSS 402*a*, and when the node type of the first node 406 is an STA, the threshold value is given by $T_{BSS}=T_{default}$ dBm, wherein the $T_{default}$ is a default CCA threshold value. Thus, when the second signal is transmitted from the AP node 402 to the station 406 it has a threshold value $T_{BSS}$, and in FIG. 4*a* this is schematically illustrated by the dotted arrow with label $T_{BSS}$ going from the AP node 402 to the station 406.

When the node type of the second node 410 is an STA operating in the OBSS 404*a*, and when the node type of the first node 402 is a WLAN AP, the threshold value is given by $T_{STA}=T_0$ dBm, wherein $T_0$ is equal to or larger than a default CCA threshold value $T_{default}$. Thus, when the second signal is transmitted from the station 410 in the OBSS to the AP node 402 it has a threshold value $T_{STA}$, and in FIG. 4*b* this is schematically illustrated by the dotted arrow with label $T_{STA}$ going from the station 410 in the OBSS to the AP node 402. As mentioned above, in some embodiments, $T_{default}$ is set to −82 dBm. Further, the value of $T_0$ decides how aggressive the transmitter, i.e. the first node, is when accessing the medium whilst there are OBSS transmissions, and the value of M decides the additional level of aggressiveness when accessing the medium towards OBSS transmissions of the same type: DL against DL, and UL against UL.

When the node type of the second node 404 is a WLAN AP operating in the OBSS 404*a*, and when the node type of the first node 402 is a WLAN AP, the threshold value is given by $T_{AP}=T_{STA}+M$ dBm, wherein $T_{STA}$ is the threshold value for the second node when being an STA, and wherein M is a margin value larger than zero and given in dB. Thus, when the second signal is transmitted from the AP node 404 in the OBSS to the AP node 402 it has a threshold value $T_{AP}$, and in FIG. 4*b* this is schematically illustrated by the dotted arrow with label $T_{AP}$ going from the AP node 404 in the OBSS to the AP node 402 in the BSS.

When the node type of the second node 410 is an STA, operating in the OBSS 404*a*, and when the node type of the first node 406 is an STA, the threshold value is given by $T_{STA}=T_{AP}+M$ dBm, wherein $T_{AP}$ is the threshold value for the second node when being a WLAN AP, and wherein M is a margin value larger than zero and given in dB. Thus, when the second signal is transmitted from the station 410 in the OBSS to the station 402 in the BSS it has a threshold value $T_{STA}$, and in FIG. 4*a* this is schematically illustrated by the dotted arrow with label $T_{STA}$ going from the station 410 in the OBSS to the station 406 in the BSS.

When the node type of the second node 404 is a WLAN AP operating in the OBSS 404*a*, and when the node type of the first node 406 is an STA, the threshold value is given by $T_{AP}=T_0$ dBm, wherein $T_0$ is equal to or larger than the default CCA threshold value $T_{default}$. Thus, when the second signal is transmitted from the AP node 404 in the OBSS to the station 406 in the BSS it has a threshold value $T_{AP}$, and in FIG. 4*a* this is schematically illustrated by the dotted arrow with label $T_{AP}$ going from the AP node 404 in the OBSS to the station 406 in the BSS.

Action 503

The first node 402,406 transmits the first signal when the signal strength of the second signal is below the threshold value.

As previously mentioned, in FIGS. 4*a* and 4*b*, the first signal is indicated by S1. Thus, FIG. 4*a* schematically illustrates the case when the first signal S1 is to be transmitted from the station 406 to the AP node 402. FIG. 4*b* schematically illustrates the case when the first signal S1 is to be transmitted from the AP node 402 to the station 406. In both FIGS. 4*a* and 4*b*, dotted arrows schematically illustrate the possible different interfering signals and their respective threshold value $T_{BSS}$, $T_{AP}$, and $T_{STA}$, respectively. Thus, the first node 402,406 will transmit the first signal when the signal strength of the second signal is below the threshold value $T_{BSS}$, $T_{AP}$, or $T_{STA}$ relevant for the second signal.

Action 504

The first node 402,406 defers from transmitting the first signal when the signal strength of the second signal is above the threshold value, whereby the transmission of the first signal is controlled. Thus, the first node 402,406 does not transmit the first signal when the signal strength of the second signal is above the threshold value $T_{BSS}$, $T_{AP}$, or $T_{STA}$ relevant for the second signal.

In some embodiments, the first node 402,406 will defer from transmitting the first signal for a period of time, e.g. a predetermined or predefined period of time. After expiry of the period of time, the first node may return to Action 501 mentioned above to detect and/or sense a possible second signal. If a second signal is detected the first node 402,406 may continue with Actions 501-504. If no second signal is detected, the first node 402,406 may transmit the first signal after the expiry of the period of time. The period of time may be set by a timer (not shown).

For example, after reading the preamble and the header of the second signal, e.g. an interfering packet, the first node 402,406 may set a timer, such as a Network Allocation Vector (NAV) timer, if it has decided to defer from transmitting the first signal. The NAV is an indicator of time periods when transmission onto the Wireless Medium (WM) is not initiated by the node regardless of whether or not the node's clear channel assessment (CCA) function senses that the WM is busy. The indicator is maintained by each node, e.g. each station (STA).

If the threshold values given in FIG. 4*a* are related to each other as: $T_{STA}>T_{AP}\geq T_{BSS}$, that means that the station 406 will back-off for weaker DL transmissions from the AP node 404 than UL transmissions from the station 410 to the AP node 404. Further, a BSS transmission from the AP node 402 to the station 408 or from the station 408 to the AP node 402 will cause back-off with the lowest threshold.

Further, if the threshold values given in FIG. 4b are related to each other as: $T_{AP} > T_{STA} \geq T_{BSS}$, that means that the AP node 402 will back-off for weaker UL transmissions from the station 410 than DL transmissions from the AP node 404. Further, a BSS transmission from the station 406 will cause back-off with the lowest threshold.

To perform the method for controlling transmission of a first signal, the first node 402,406 may comprise an arrangement depicted in FIG. 6. As previously mentioned, the first node 402,406 is operating in the BSS 402a comprised in the WLAN 400.

In some embodiments, the first node 402,406 comprises an Input and/or output Interface 600 configured to communicate with one or more second nodes 402,404,406,408,410, such as one or more AP nodes 402,404, or one or more stations 406,408,410. The input and/or output interface 600 may comprise a wireless receiver and a wireless transmitter.

The first node 402,406 is configured to transmit, e.g. by means of a transmitting module 601 configured to transmit, the first signal. For example, the first node 402,406 is configured to transmit, e.g. by means of the transmitting module 601 configured to transmit, the first signal transmit the first signal when the signal strength of the second signal is below a threshold value. This relates to Action 503 described above. Further, the first node 402,406 may defer from transmitting the first signal when the signal strength of the second signal is above the threshold value. This relates to Action 504 described above. Thereby the transmission of the first signal is controlled.

Further, the first node 402,406 may be configured to transmit, e.g. by means of the transmitting module 601 configured to transmit, a signal and/or data to one or more second node 402,404,406,408,410.

The transmitting module 601 may be the wireless transmitter or a processor 606 of the first node 402,406. The processor 606 will be described in more detail below.

The first node 402,406 may further be configured to receive, e.g. by means of a receiving module 602 configured to receive, a second signal transmitted from the second node 402,404,406,408,410 operating in the WLAN 400. The receiving module 602 may be the wireless receiver or the processor 606 of the first node 402,406.

The first node 402,406 is configured to detect, e.g. by means of a detecting module 603 configured to detect, a second signal transmitted from the second node 402,404, 406,408,410 operating in the WLAN 400.

Further, the first node 402,406 may be configured to detect, e.g. by means of the detecting module 603 configured to detect, the node type of the second node 402,404,406, 408,410 by determining a node type identity based on the detected signal. As previously mentioned, the node type identity may be determined based on the Partial Identity (PAID) or the Group Identity (GROUP ID) stated in the SIG A1 field of the Very High Throughput (VHT) preamble comprised in the detected signal.

Furthermore, the first node 402,406 may be configured to detect, e.g. by means of the detecting module 603 configured to detect, whether the second node 402,404,406,408,410 is operating in the BSS 402a or in the OBSS 404a overlapping the BSS 402a and comprised in the WLAN 400 by reading an BSS identity comprised in the detected signal. The BSS identity may be given by reading the PAID or the GROUP ID stated in the SIG A1 field of the VHT preamble comprised in the detected signal.

Further, the first node 402,406 is configured to compare e.g. by means of a comparing module 604 configured to compare, a signal strength of the second signal with a threshold value for the second node 402,404,406,408,410, which threshold value is determined based on the node type of the second node 402,404,406,408,410.

In some embodiments, the threshold value for the second node 402,404,406,408,410 is based on whether the second node 402,404,406,408,410 is operating in the BSS 402a or in the OBSS 404a overlapping the BSS 402a and comprised in the WLAN 400.

The threshold value for the second node 402,404,406, 408,410 may further be based on the node type of the first node 402,406.

When the node type of the second node 406 is an STA operating in the BSS 402a, the threshold value is given by $T_{BSS} = T_{default}$ dBm, wherein the $T_{default}$ is the default CCA threshold value. In some embodiments, $T_{default}$ is set to −82 dBm.

When the node type of the second node 402 is a WLAN AP operating in the BSS 402a, and when the node type of the first node 406,408 is an STA, the threshold value is given by $T_{BSS} = T_{default}$ dBm, wherein the $T_{default}$ is the default CCA threshold value.

When the node type of the second node 410 is an STA operating in the OBSS 404a, and when the first node 402 is a WLAN AP, the threshold value is given by $T_{STA} = T_0$ dBm, wherein $T_0$ is equal to or larger than the default CCA threshold value $T_{default}$. In some embodiments, $T_{default}$ is set to −82 dBm. The value of $T_0$ decides how aggressive the transmitter, i.e. the first node, is when accessing the medium whilst there are OBSS transmissions, and the value of M decides the additional level of aggressiveness when accessing the medium towards OBSS transmissions of the same type: DL against DL, and UL against UL.

When the node type of the second node 404 is a WLAN AP operating in the OBSS 404a, and when the node type of the first node 402 is a WLAN AP, the threshold value is given by $T_{AP} = T_{STA} + M$ dBm, wherein $T_{STA}$ is the threshold value for the second node when being an STA and wherein M is a margin value given in dB.

When the node type of the second node 410 is an STA operating in the OBSS 404a, and when the node type of the first node 406 is an STA, the threshold value is given by $T_{STA} = T_{AP} + M$ dBm, wherein $T_{AP}$ is the threshold value for the second node when being a WLAN AP and wherein M is a margin value larger than zero and given in dB.

When the node type of the second node 404 is a WLAN AP operating in the OBSS 404a, and when the node type of the first WLAN node 406 is an STA, the threshold value is given by $T_{AP} = T_0$ dBm, wherein $T_0$ is equal to or larger than the default CCA threshold value $T_{default}$. As previously mentioned, in some embodiments, $T_{default}$ is set to −82 dBm. Further, the value of $T_0$ decides how aggressive the transmitter, i.e. the first node, is when accessing the medium whilst there are OBSS transmissions, and the value of M decides the additional level of aggressiveness when accessing the medium towards OBSS transmissions of the same type: DL against DL, and UL against UL.

The first node 402,406 may also comprise means for storing data such as user code data, e.g. information relating to neighbouring AP nodes, wireless devices, threshold values, etc. In some embodiments, the first node 402,406 comprises a memory 605 configured to store the data. The data may be processed or non-processed data and/or information relating thereto. The memory 605 may comprise one or more memory units. Further, the memory 605 may be a computer data storage or a semiconductor memory such as a computer memory, a read-only memory, a volatile memory or a non-volatile memory. The memory 605 is arranged to be used to store obtained information, data, configurations, schedulings, and applications etc. to perform the methods herein when being executed in the first node 402,406.

Embodiments herein for controlling transmission of the first signal may be implemented through one or more processors, such as the processor 606 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the first node 402,406. One such carrier may be in the form of an electronic signal, an optical signal, a radio signal or a computer readable storage medium. The computer readable storage medium may be a CD ROM disc or a memory stick.

The computer program code may furthermore be provided as pure program code on a server and downloaded to the first node 402,406.

Those skilled in the art will also appreciate that the transmitting module, receiving module, detecting module and comparing module described above may refer to a combination of analog and digital circuits, and/or one or more processors configured with software and/or firmware, e.g. stored in the memory, that when executed by the one or more processors such as the processors in the first node 402,406 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplifying Embodiments

When a node n, e.g. the first node 402,406, performs the CCA and detects a transmission, e.g. the second signal, it identifies the source k, e.g. the second node 402,404,406, 408,410, as either:

Originating from within the BSS (type BSS)
Originating from an OBSS AP (type AP)
Originating from an OBSS STA (type STA)

Depending on the source type, e.g. AP or STA, node n then checks whether the second signal surpassed the threshold value $T_{BSS}$, $T_{AP}$, $T_{STA}$, wherein $T_{AP}=T_{STA}+M$, $T_{STA}=T_0$, $T_{BSS}=T_{default}$ [dBm] if n is an AP,
$T_{STA}=T_{AP}+M$, $T_{AP}=T_0$, $T_{BSS}=T_{default}$ [dBm] if n is a STA.

If the second signal surpasses the threshold value, node n defers from transmitting the first signal.

The effect of this scheme will be to partly synchronize the UL and DL transmissions, respectively, since simultaneous UL-DL will tend to be avoided through transmission back-off. By the term "transmission back-off" when used herein is meant that the node n, e.g. the first node, defers from transmitting the first signal. A comparison of simulation results for a system using embodiments described herein and for a system using the standard solution with a fixed threshold is shown in FIGS. 7a and 7b.

FIG. 7a schematically illustrates the uplink user throughput for a legacy system and for a system according to embodiments herein, and FIG. 7b schematically illustrates the downlink user throughput for the legacy system and for the system according to embodiments herein. In the FIGS. 7a and 7b, the lines with the triangles represents the 5$^{th}$ percentile user throughput, and the solid lines represent the mean user throughput. In the system according to embodiments herein, $T_0=82$ dBm, $M=20$ dB, and $T_{default}=-82$ dBm. In the legacy system $T_{CCA}=-82$ dBm.

As previously mentioned, one might choose to set the values of $T_{BSS}$, $T_{AP}$ and $T_{STA}$ differently depending on the node type of node n performing the CCA and intending to transmit. A reason for this could be that different power levels are used in APs and STAs or that different receiver antennas are used. For instance, the receiver capabilities in an AP could be so that it sustains higher interference levels than an STA and the STA n could therefore use a higher CCAT, thereby exposing the transmission to more interference but gaining channel access. This may then imply a set of six threshold values (which do not all need to be different): $T_{BSS}^{AP}$, $T_{AP}^{AP}$, $T_{STA}^{AP}$ in nodes of type AP, and $T_{BSS}^{STA}$, $T_{AP}^{STA}$, $T_{STA}^{STA}$, in nodes of type STA. Then the superscript indicates the type of node n performing the CCA, and the subscript the type of the sensed transmission from k.

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first node for controlling transmission of a first signal, wherein the first node is operating in a Basic Service Set, BSS, comprised in a Wireless Local Area Network, WLAN, and wherein the method comprises:
   detecting a second signal transmitted from a second node operating in the WLAN;
   determining a node type of the second node;
   comparing a signal strength of the second signal with a threshold value for the second node, wherein the threshold value for the second node is determined based on the node type of the second node, wherein each threshold value for each one of a plurality of node types including the node type of the second node comprises a different threshold value than each other node type of the plurality of node types;
   transmitting the first signal when the signal strength of the second signal is below the threshold value; and
   deferring from transmitting the first signal when the signal strength of the second signal is above the threshold value, whereby the transmission of the first signal is controlled.

2. The method of claim 1, wherein the threshold value for the second node is further based on whether the second node is operating in the BSS or in an Overlapping BSS, OBSS, overlapping the BSS and comprised in the WLAN.

3. The method of claim 1, wherein when the node type of the second node is a station, STA, and the second node is operating in the BSS, the threshold value is given by TBSS=Tdefault dBm, wherein the Tdefault is a default Clear Channel Assessment, CCA, threshold value.

4. The method of claim 2, wherein the threshold value for the second node is further determined based on a node type of the first node.

5. The method of claim 4, wherein when the node type of the second node is a WLAN Access Point, AP, and the second node is operating in the BSS, and when the node type of the first node is a station, STA, the threshold value is given by TBSS=Tdefault dBm, wherein the Tdefault is a default Clear Channel Assessment, CCA, threshold value.

6. The method of claim 4, wherein when the node type of the second node is a station, STA, and the second node is operating in the OBSS, and when the node type of the first node is a WLAN Access Point, AP, the threshold value is given by TSTA=T0 dBm, wherein T0 is equal to or larger than a default Clear Channel Assessment, CCA, threshold value Tdefault.

7. The method of claim 4, wherein when the node type of the second node is a WLAN Access Point, AP, and the second node is operating in the OBSS, and when the node type of the first node is a WLAN AP, the threshold value is given by TAP=TSTA+M dBm, wherein TSTA is the threshold value for the second node when being a station, STA, and wherein M is a margin value given in dB.

8. The method of claim 4, wherein when the node type of the second node is a station, STA, and the second node is operating in the OBSS, and when the node type of the first node is a STA, the threshold value is given by TSTA=TAP+M dBm, wherein TAP is the threshold value for the second node when being a WLAN Access Point, AP, and wherein M is a margin value given in dB.

9. The method of claim 4, wherein when the node type of the second node is a WLAN Access Point, AP, and the second node is operating in the OBSS, and when the node type of the first node is a station, STA, the threshold value is given by TAP=T0 dBm, wherein T0 is equal to or larger than a default Clear Channel Assessment, CCA, threshold value Tdefault.

10. The method of claim 1, wherein determining the node type of the second node comprises:
detecting the node type of the second node by determining a node type identity based on the second signal.

11. The method of claim 10, wherein the node type identity is determined based on a Partial Identity, PAID, or a Group Identity, GROUP ID, stated in a SIG A1 field of a Very High Throughput, VHT, preamble comprised in the second signal.

12. The method of claim 1, wherein detecting the second signal further comprises:
detecting whether the second node is operating in the BSS or in an Overlapping BSS, OBSS, overlapping the BSS and comprised in the WLAN by reading a BSS identity comprised in the second signal.

13. The method of claim 12, wherein the BSS identity is given by reading a Partial Identity, PAID, or a Group Identity, GROUP ID, stated in a SIG A1 field of a Very High Throughput, VHT, preamble comprised in the second signal.

14. A first node for controlling transmission of a first signal, wherein the first node is operating in a Basic Service Set, BSS, comprised in a Wireless Local Area Network, WLAN, and wherein the first node is configured to:
detect a second signal transmitted from a second node operating in the WLAN;
determine a node type of the second node;
compare a signal strength of the second signal with a threshold value for the second node, wherein the threshold value is determined based on the node type of the second node, wherein each threshold value for each one of a plurality of node types including the node type of the second node comprises a different threshold value than each other node type of the plurality of node types;
transmit the first signal when the signal strength of the second signal is below the threshold value; and
defer from transmitting the first signal when the signal strength of the second signal is above the threshold value, whereby the transmission of the first signal is controlled.

15. The first node of claim 14, wherein the threshold value for the second node is further based on whether the second node is operating in the BSS or in an Overlapping BSS, OBSS, overlapping the BSS and comprised in the WLAN.

16. The first node of claim 14, wherein when the node type of the second node is a station, STA, and the second node is operating in the BSS and the threshold value is given by TBSS=Tdefault dBm, wherein the Tdefault is a default Clear Channel Assessment, CCA, threshold value.

17. The first node of claim 16, wherein the threshold value for the second node is further based on a node type of the first node.

18. The first node of claim 17, wherein when the node type of the second node is a WLAN Access Point, AP, and the second node is operating in the BSS and when the node type of the first node is a station, STA, the threshold value is given by TBSS=Tdefault dBm, wherein the Tdefault is a default Clear Channel Assessment, CCA, threshold value.

19. The first node of claim 17, wherein when the node type of the second node is a station, STA, and the second node is operating in an Overlapping BSS, OBSS, overlapping the BSS and when the first node is a WLAN Access Point, AP, the threshold value is given by TSTA=T0 dBm, wherein T0 is equal to or larger than a default Clear Channel Assessment, CCA, threshold value Tdefault.

20. The first node of claim 17, wherein when the node type of the second node is a WLAN Access Point, AP, and the second node is operating in an Overlapping BSS, OBSS, overlapping the BSS and when the node type of the first node is a WLAN AP, the threshold value is given by TAP=TSTA+M dBm, wherein TSTA is the threshold value for the second node when being a station, STA, and wherein M is a margin value given in dB.

21. The first node of claim 17, wherein when the node type of the second node is a station, STA, and the second node is operating in an Overlapping BSS, OBSS, overlapping the BSS and when the node type of the first node is a STA, the threshold value is given by TSTA=TAP+M dBm, wherein TAP is the threshold value for the second node when being a WLAN Access Point, AP, and wherein M is a margin value given in dB.

22. The first node of claim 17, wherein when the node type of the second node is a WLAN Access Point, AP, and the second node is operating in an Overlapping BSS, OBSS, overlapping the BSS and when the node type of the first node is a station, STA, the threshold value is given by TAP=T0 dBm, wherein T0 is equal to or larger than a default Clear Channel Assessment, CCA, threshold value Tdefault.

23. The first node of claim 14, wherein the first node further is configured to:
detect the node type of the second node by determining a node type identity based on the second signal.

24. The first node of claim 23, wherein the node type identity is determined based a Partial Identity, PAID, or a Group Identity, GROUP ID, stated in a SIG A1 field of a Very High Throughput, VHT, preamble comprised in the second signal.

25. The first node of claim 14, wherein the first node further is configured to:
detect whether the second node is operating in the BSS or in an Overlapping BSS, OBSS, overlapping the BSS and comprised in the WLAN by reading a BSS identity comprised in the second signal.

26. The first node of claim 25, wherein the BSS identity is given by reading a Partial Identity, PAID, a Group Identity, GROUP ID, stated in a SIG A1 field of a Very High Throughput, VHT, preamble comprised in the second signal.

27. A method performed by a first node to control transmission of a first signal, wherein the first node is operating in a Basic Service Set, BSS, comprised in a Wireless Local Area Network, WLAN, and wherein the method comprises:
- detecting a second signal transmitted from a second node operating in the WLAN;
- determining a node type of the second node;
- comparing a signal strength of the second signal with a threshold value for the second node, wherein the threshold value is determined based on the node type of the second node wherein each threshold value for each one of a plurality of node types including the node type of the second node comprises a different threshold value than each other node type of the plurality of node types;
- determining whether to transmit the first signal based on comparing the signal strength of the second signal with the threshold value for the second node that is based on the node type of the second node;
- transmitting the first signal when the signal strength of the second signal is below the threshold value;
- deferring from transmitting the first signal for a period of time when the signal strength of the second signal is above the threshold value, whereby the transmission of the first signal is controlled; and
- after deferring for the period of time, transmitting the first signal.

* * * * *

UNITED STATES PATENT AND TRADEMARK OFFICE
CERTIFICATE OF CORRECTION

PATENT NO. : 10,462,799 B2
APPLICATION NO. : 15/541029
DATED : October 29, 2019
INVENTOR(S) : Wikstrom et al.

It is certified that error appears in the above-identified patent and that said Letters Patent is hereby corrected as shown below:

In the Specification

In Column 11, Line 13, delete "Input and/or output Interface" and insert -- input and/or output interface --, therefor.

In Column 13, Line 16, delete "CD ROM" and insert -- CD-ROM --, therefor.

In Column 14, Line 2, delete "$T_0$=82 dBm," and insert -- $T_0$=-82 dBm, --, therefor.

In the Claims

In Column 14, Line 59, in Claim 3, delete "TBSS=Tdefault dBm, wherein the Tdefault" and insert -- $T_{BSS}=T_{default}$ dBm, wherein the $T_{default}$ --, therefor.

In Column 15, Line 1, in Claim 5, delete "TBSS=Tdefault dBm, wherein the Tdefault" and insert -- $T_{BSS}=T_{default}$ dBm, wherein the $T_{default}$ --, therefor.

In Column 15, Line 7, in Claim 6, delete "TSTA=T0 dBm, wherein T0" and insert -- $T_{STA}=T_0$ dBm, wherein $T_0$ --, therefor.

In Column 15, Line 9, in Claim 6, delete "Tdefault." and insert -- $T_{default}$. --, therefor.

In Column 15, Line 14, in Claim 7, delete "TAP=TSTA+M dBm, wherein TSTA" and insert -- $T_{AP}=T_{STA}+M$ dBm, wherein $T_{STA}$ --, therefor.

In Column 15, Line 22, in Claim 8, delete "TSTA=TAP+M dBm, wherein TAP" and insert -- $T_{STA}=T_{AP}+M$ dBm, wherein $T_{AP}$ --, therefor.

In Column 15, Line 29, in Claim 9, delete "TAP=T0 dBm, wherein T0" and insert -- $T_{AP}=T_0$ dBm, wherein $T_0$ --, therefor.

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,462,799 B2

In Column 15, Line 31, in Claim 9, delete "Tdefault." and insert -- $T_{default}$. --, therefor.

In Column 16, Line 12, in Claim 16, delete "TBSS=Tdefault dBm, wherein the Tdefault" and insert -- $T_{BSS}=T_{default}$ dBm, wherein the $T_{default}$ --, therefor.

In Column 16, Line 21, in Claim 18, delete "TBSS=Tdefault dBm, wherein the Tdefault" and insert -- $T_{BSS}=T_{default}$ dBm, wherein the $T_{default}$ --, therefor.

In Column 16, Lines 27-28, in Claim 19, delete "TSTA=T0 dBm, wherein T0" and insert -- $T_{STA}=T_0$ dBm, wherein $T_0$ --, therefor.

In Column 16, Line 29, in Claim 19, delete "Tdefault." and insert -- $T_{default}$. --, therefor.

In Column 16, Line 35, in Claim 20, delete "TAP=TSTA+M dBm, wherein TSTA" and insert -- $T_{AP}=T_{STA}+M$ dBm, wherein $T_{STA}$ --, therefor.

In Column 16, Lines 42-43, in Claim 21, delete "TSTA=TAP+M dBm, wherein TAP" and insert -- $T_{STA}=T_{AP}+M$ dBm, wherein $T_{AP}$ --, therefor.

In Column 16, Line 51, in Claim 22, delete "TAP=T0 dBm, wherein T0" and insert -- $T_{AP}=T_0$ dBm, wherein $T_0$ --, therefor.

In Column 16, Line 52, in Claim 22, delete "Tdefault." and insert -- $T_{default}$. --, therefor.